United States Patent
Lee et al.

(10) Patent No.: US 7,480,911 B2
(45) Date of Patent: Jan. 20, 2009

(54) METHOD AND APPARATUS FOR DYNAMICALLY ALLOCATING AND DEALLOCATING PROCESSORS IN A LOGICAL PARTITIONED DATA PROCESSING SYSTEM

(75) Inventors: Van Hoa Lee, Cedar Park, TX (US); David R. Willoughby, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1319 days.

(21) Appl. No.: 10/142,545

(22) Filed: May 9, 2002

(65) Prior Publication Data

US 2003/0212884 A1 Nov. 13, 2003

(51) Int. Cl.
*G06F 9/46* (2006.01)
(52) U.S. Cl. .................................. 718/104; 719/319
(58) Field of Classification Search ............... 718/104, 718/106; 719/319
See application file for complete search history.

(56) References Cited

U.S. PATENT DOCUMENTS

| | | | | |
|---|---|---|---|---|
| 5,784,702 | A | | 7/1998 | Greenstein et al. .......... 711/173 |
| 5,898,855 | A | * | 4/1999 | Onodera et al. ................ 718/1 |
| 6,012,151 | A | * | 1/2000 | Mano .......................... 714/11 |
| 6,247,109 | B1 | | 6/2001 | Kleinsorge et al. ............ 712/13 |
| 6,330,656 | B1 | * | 12/2001 | Bealkowski et al. .......... 712/13 |
| 6,332,180 | B1 | * | 12/2001 | Kauffman et al. ........... 711/153 |
| 6,363,468 | B1 | | 3/2002 | Allison ....................... 711/173 |
| 6,381,682 | B2 | * | 4/2002 | Noel et al. .................. 711/153 |
| 6,633,916 | B2 | * | 10/2003 | Kauffman .................... 709/229 |
| 6,647,508 | B2 | * | 11/2003 | Zalewski et al. ............... 714/3 |
| 6,754,828 | B1 | * | 6/2004 | Marisetty et al. .............. 726/2 |
| 6,792,497 | B1 | * | 9/2004 | Gold et al. .................. 710/317 |
| 6,859,892 | B2 | * | 2/2005 | Bolding et al. ................ 714/34 |
| 6,968,441 | B1 | * | 11/2005 | Schnee ........................ 711/173 |
| 2002/0016891 | A1 | | 2/2002 | Noel et al. ................... 711/153 |
| 2002/0091786 | A1 | * | 7/2002 | Yamaguchi et al. ......... 709/213 |
| 2002/0108074 | A1 | | 8/2002 | Shimooka et al. ............. 714/25 |
| 2002/0152344 | A1 | | 10/2002 | Holm et al. .................. 710/260 |
| 2003/0028739 | A1 | | 2/2003 | Li et al. ...................... 711/170 |

(Continued)

FOREIGN PATENT DOCUMENTS

EP 0 405 724 A2 2/1991

(Continued)

OTHER PUBLICATIONS

Davidson et al., "Dynamic Addition/Deletion of a Parallel CPU", IBM Technical Disclosure Bulletin, vol. 20, No. 6, Nov. 1977, pp. 2191-2192.

(Continued)

*Primary Examiner*—Andy Ho
(74) *Attorney, Agent, or Firm*—Duke W. Yee; Diana L. Roberts-Gerhardt; Wayne P. Bailey (57) ABSTRACT

A method, apparatus, and computer instructions for managing a set of processors. In response to a request to deallocate a processor assigned to a partition within the logical partitioned data processing system, the processor in the set of processors, is stopped. In response to stopping the processor, the processor is placed in an isolated state in which the processor is isolated from the partition. The processor is then placed in a pool of resources for later reassignment.

32 Claims, 5 Drawing Sheets

U.S. PATENT DOCUMENTS

| | | | | |
|---|---|---|---|---|
| 2003/0126396 A1 | 7/2003 | Camble et al. | .............. | 711/173 |
| 2003/0131042 A1 | 7/2003 | Awada et al. | ............... | 709/104 |
| 2003/0131214 A1 | 7/2003 | Downer et al. | ................ | 712/13 |

FOREIGN PATENT DOCUMENTS

| | | |
|---|---|---|
| JP | 04346136 | 12/1992 |
| JP | 06103092 | 4/1994 |
| JP | 2002041304 | 2/2002 |

OTHER PUBLICATIONS

Lee et al., Method and Apparatus for Managing Memory Blocks in a Logical Partitioned Data Processing System.

Lee et al., Method and Apparatus for Dynamically Managing Input/Output Slots in a Logical Partitioned Data Processing System.

* cited by examiner

FIG. 1
100 DATA PROCESSING SYSTEM

METHOD AND APPARATUS FOR DYNAMICALLY ALLOCATING AND DEALLOCATING PROCESSORS IN A LOGICAL PARTITIONED DATA PROCESSING SYSTEM

CROSS REFERENCE TO RELATED APPLICATIONS

The present invention is related to the following applications entitled: "Method and Apparatus for Managing Memory Blocks in a Logical Partitioned Data Processing System", Ser. No. 10/142,574 (status: issued as U.S. Pat. No. 6,941,436 on Sep. 6, 2005), and "Method and Apparatus for Dynamically Managing Input/Output Slots in a Logical Partitioned Data Processing System", Ser. No. 10/142,524 (status: abandoned), all filed even date hereof, assigned to the same assignee, and incorporated herein by reference.

BACKGROUND OF THE INVENTION

1. Technical Field

The present invention relates generally to an improved data processing system, and in particular, to a method and apparatus for managing components in a data processing system. Still more particularly, the present invention provides a method and apparatus for managing processors in a logical partitioned data processing system.

2. Description of Related Art

A logical partitioned (LPAR) functionality within a data processing system (platform) allows multiple copies of a single operating system (OS) or multiple heterogeneous operating systems to be simultaneously run on a single data processing system platform. A partition, within which an operating system image runs, is assigned a non-overlapping subset of the platform's resources. These platform allocable resources include one or more architecturally distinct processors within their interrupt management area, regions of system memory, and input/output (I/O) adapter bus slots. The partition's resources are represented by the platform's firmware to the OS image.

Each distinct OS or image of an OS running within the platform is protected from each other such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to the OS. Furthermore, software errors in the control of an operating system's allocated resources are prevented from affecting the resources of any other image. Thus, each image of the OS (or each different OS) directly controls a distinct set of allocable resources within the platform.

With respect to hardware resources in a LPAR system, these resources are disjointly shared among various partitions, themselves disjoint, each one seeming to be a stand-alone computer. These resources may include, for example, input/output (I/O) adapters, memory dimms, non-volatile random access memory (NVRAM), and hard disk drives. Each partition within the LPAR system may be booted and shutdown over and over without having to power-cycle the whole system.

In reality, some of the I/O devices that are disjointly shared among the partitions are themselves controlled by a common piece of hardware, such as a host Peripheral Component Interface (PCI) bridge, which may have many I/O adapters controlled or below the bridge. The host bridge and the I/O adapters connected to the bridge form a hierarchical hardware sub-system within the LPAR system. Further, this bridge may be thought of as being shared by all of the partitions that are assigned to its slots.

Currently, when a system administrator wants to change resources given to different partitions, the partitions affected by the change must be brought down or shut down before these resources can be deallocated from one partition and reallocated to another partition. This type of deallocation and allocation capability is called static logical partitioning. This type of capability causes a temporary disruption of normal operation of the affected partitions. This temporary disruption of normal operation may affect users or other clients of the LPAR system.

Therefore, it would be advantageous to have an improved method, apparatus, and computer instructions for managing partitions in a LPAR system without requiring a disruption in operations of the affected partitions.

SUMMARY OF THE INVENTION

The present invention provides a method, apparatus, and computer instructions for managing a set of processors. In response to a request to deallocate a processor assigned to a partition within the logical partitioned data processing system, the processor in the set of processors, is stopped. In response to stopping the processor, the processor is placed in an isolated state in which the processor is isolated from the partition. The processor is then placed in a pool of resources for later reassignment.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
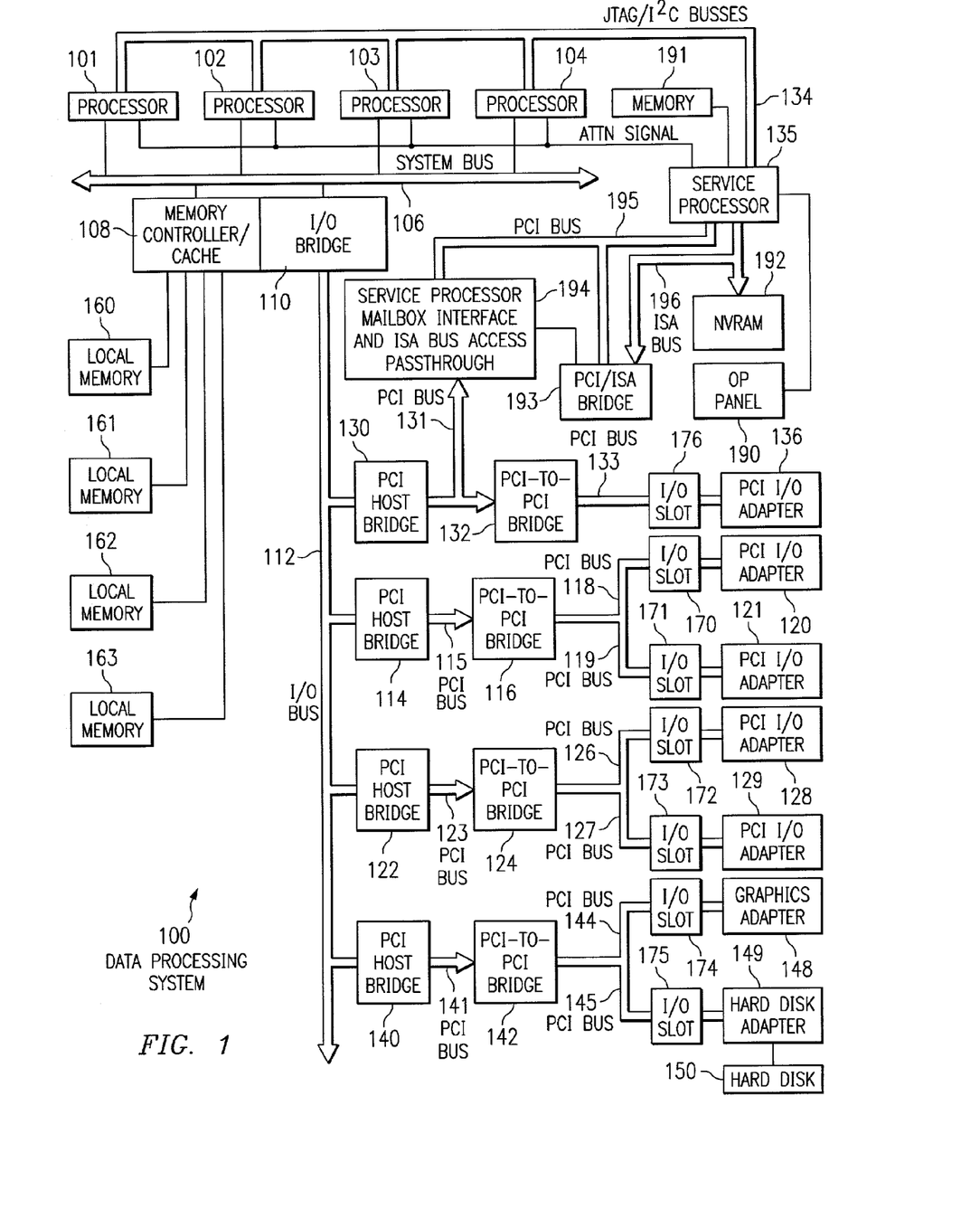
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logical partitioned such that different PCI I/O adapters 120-121, 128-129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and each of local memories 160-163 is assigned to one of the three partitions. For example, processor 101, local memory 160, and I/O adapters 120, 128, and 129 may be assigned to logical partition P1; processors 102-103, local memory 161, and PCI I/O adapters 121 and 136 may be assigned to partition P2; and processor 104, local memories 162-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000 operating system may be operating within logical partition P1. Windows 2000 is a product and trademark of Microsoft Corporation of Redmond, Wash.

Peripheral component interconnect (PCI) host bridge 114 connected to I/O bus 112 provides an interface to PCI local bus 115. A number of PCI input/output adapters 120-121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128-129. PCI I/O adapters 128-129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101-104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I$^2$C busses 134 to interrogate the system (host) processors 101-104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases the host processors 101-104 for execution of the code loaded into local memory 160-163. While the host processors 101-104 are executing code from respective operating systems within the data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
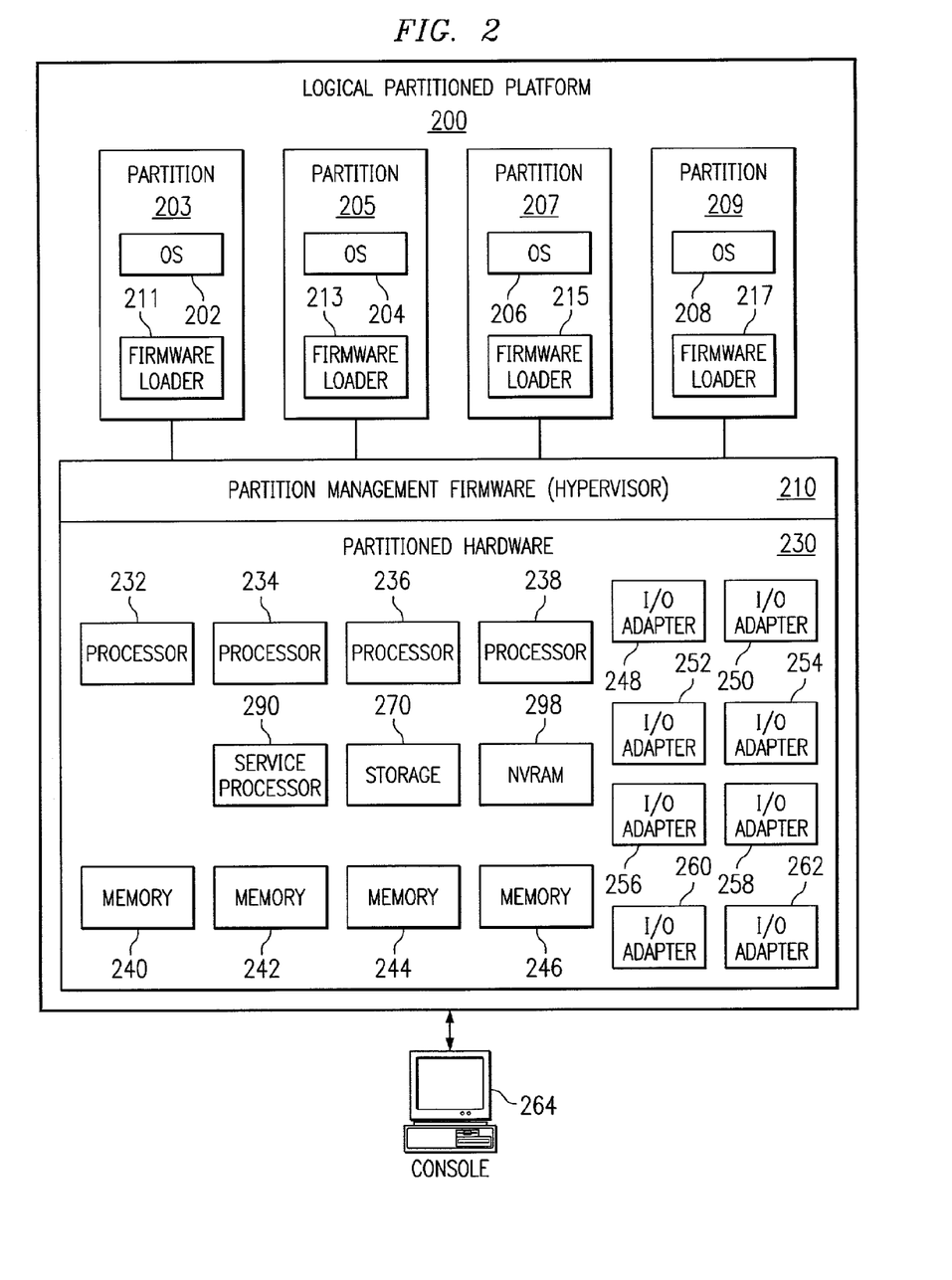
FIG. 2 is a block diagram of an exemplary logical partitioned platform in which the present invention may be implemented.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems 202, 204, 206), 208, and hypervisor 210. Operating systems 202, 204, 206, and 208 may be multiple copies of a single operating system or multiple heterogeneous operating systems simultaneously run on platform 200. These operating systems may be implemented using OS/400, which are designed to interface with a hypervisor. Operating systems 202, 204, 206, and 208 are located in partitions 203, 205, 207, and 209.

Additionally, these partitions also include firmware loaders 211, 213, 215, and 217. Firmware loaders 211, 213, 215, and 217 may be implemented using IEEE-1275 Standard Open Firmware and runtime abstraction software (RTAS), which is available from International Business Machines Corporation. When partitions 203, 205, 207, and 209 are instantiated, a copy of the open firmware is loaded into each partition by the hypervisor's partition manager. The processors associated or assigned to the partitions are then dispatched to the partitions' memory to execute the partition firmware.

Partitioned hardware 230 includes a plurality of processors 232-238, a plurality of system memory units 240-246, a plurality of input/output (I/O) adapters 248-262, and a storage unit 270. Partitioned hardware 230 also includes service processor 290, which may be used to provide various services, such as processing of errors in the partitions. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware (hypervisor) 210 performs a number of functions and services for partitions 203, 205, 207, and 209 to create and enforce the partitioning of logical partitioned platform 200. Hypervisor 210 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 210 allows the simultaneous execution of independent OS images 202, 204, 206, and 208 by virtualizing all the hardware resources of logical partitioned platform 200.

Operations of the different partitions may be controlled through a hardware management console, such as console 264. Console 264 is a separate data processing system from which a system administrator may perform various functions including reallocation of resources to different partitions.

Figure 3:
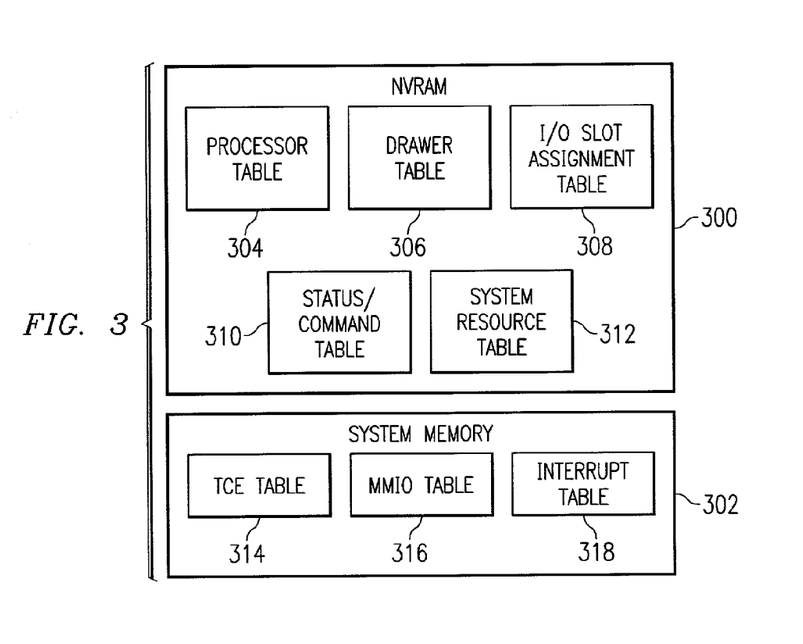
FIG. 3 is a diagram illustrating LPAR tables in accordance with a preferred embodiment of the present invention.

Turning next to FIG. 3, a diagram illustrating LPAR tables is depicted in accordance with a preferred embodiment of the present invention. In this example, LPAR tables are located in NVRAM 300 and system memory 302. NVRAM 300 may be implemented as NVRAM 298 in FIG. 2, and system memory 302 may be implemented as memory 244 in FIG. 2. The information in these tables is used for identifying what resources are assigned to particular partitions as well as status information.

In this example, in NVRAM 300, these tables include processor table 304, drawer table 306, input/output (I/O) slot assignment table 308, status/command table 310, and system resource table 312. Processor table 304 maintains a record for each of the processors located within the LPAR data processing system. Each record in this table may include, for example, an ID of the logical partition assigned to the processor, a physical location ID, a processor status, and a processor state.

Drawer table 306 includes a record for each drawer within the LPAR system in which each record may contain drawer status and the number of slots. A drawer is a location within a frame. Each drawer has some maximum number of slots into which processor nodes, I/O devices, and memory boards are mounted. Frames provide a mounting as well as power for various components.

I/O slot assignment table 308 includes a record for each slot in the LPAR system and may, for example, include a location code, an I/O device ID, and an ID of the partition assigned to the slot.

System memory 302 includes translation control entry (TCE) table 314, memory mapped input/output (MMIO) table 316, and interrupt table 318. These tables contain information used to identify resources used to access I/O slots. For example, TCE table 314 may include translation control entries (TCEs) for direct memory access (DMA) addresses for each slot. Additionally, memory mapped input/output (MMIO) addresses for slots are located in MMIO table 316. Further, interrupts assigned to the different slots also may be identified in interrupt table 318. This information is controlled and accessible by a hypervisor, such as hypervisor 210 in FIG. 2.

Status/command table 310 includes a record for each partition. This table may include a command state of the partition, a current command for the partition, and a last command for the partition.

System resource table 312 maintains information regarding resources available for the system. This table may include, for example, a maximum number of slots, a maximum number of processors, a maximum number of drawers, total memory installed, total memory allocated for the partitions, and time information.

Figure 4:
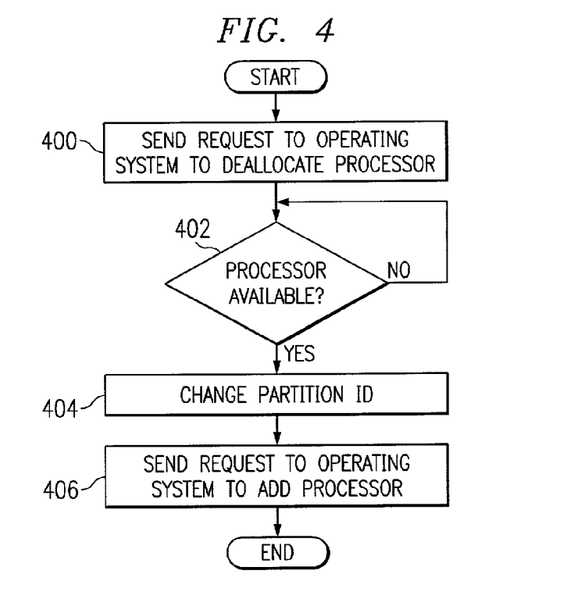
FIG. 4 is a flowchart of a process used for reallocating a processor from one partition to another partition in accordance with a preferred embodiment of the present invention.

Turning now to FIG. 4, a flowchart of a process used for reallocating a processor from one partition to another partition is depicted in accordance with a preferred embodiment of the present invention. The process illustrated in FIG. 4 may be implemented in a hardware management console, such as console 264 in FIG. 2. The steps may be implemented through a user initiating each of the steps or through a user input selecting a processor and the partitions involved in the dynamic reallocation with the process initiating each step based on a response from the operating system. In this example, the request is to deallocate a processor from a first partition and have that processor allocated to a second partition.

The process begins by sending a request to the operating system to deallocate a processor from a first partition (step 400). This request will include a processor ID to identify the processor in this example. A determination is then made as to whether the processor is available (step 402). This determination basically monitors for an availability of the processor in a global pool of processors. If a processor is unavailable, the process continues to return to step 402. Otherwise, the partition ID in the table of available processors is changed from the first partition to the second partition (step 404). This partition ID is changed in a processor table, such as processor table 304 in FIG. 3. Thereafter, a request is sent to the operating system in the second partition to add that processor (step 406) with the process terminating thereafter.

The figures described below illustrate the processes employed by the operating system, firmware loader, and the hypervisor to deallocate and allocate a processor. In these examples, the processes are ones that are initiated in response to requests from a console.

Figure 5:
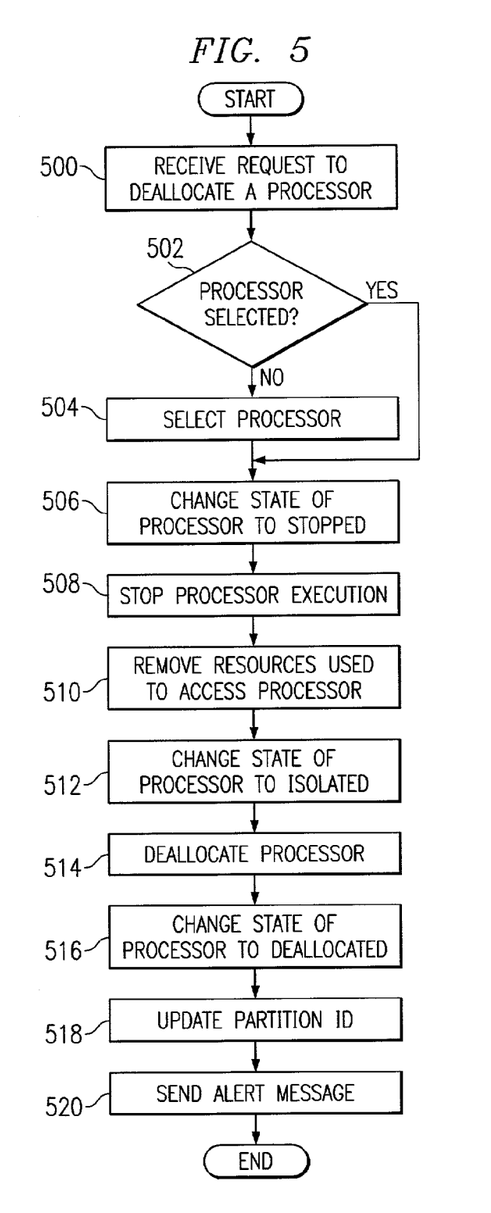
FIG. 5 is a flowchart of a process used for deallocating a processor in accordance with a preferred embodiment of the present invention.

With reference now to FIG. 5, a flowchart of a process used for deallocating a processor is depicted in accordance with a preferred embodiment of the present invention. The process illustrated in FIG. 5 may be implemented in a logical partitioned data processing system such as logical partitioned platform 200 in FIG. 2.

The process begins by receiving a request to deallocate a processor (step 500). In these examples, the request is received from the operating system for the partition. Next, a determination is made as to whether a processor is selected (step 502). If a processor is not selected, a processor is selected (step 504). In this example, the processor is selected by the operating system based on some policy or set of rules. For example, to respond to this unspecific deallocation request, the operating system decides which processor will be chosen based on attributes such as, for example, the processor interrupt priority and the workload of the processor.

The state of the processor is changed to stopped (step 506), and the processor execution is stopped (step 508). Step 506 is initiated by the operating system to dispatch the selected processor to make a RTAS call. In this example, the call is a rtas_stop_self() call. In response to this call, the selected processor initiates a call to the hypervisor, such as hypervisor 210, to change the state of the processor from running to stopped. In this state, the processor enters a loop, also referred to as a rtas_spin_loop() in which the processor waits for a trigger event to be sent from another processor in the partition. Additionally, the operating system will make a query to ensure that the selected processor has changed to a stopped state. This query may be made by the operating system through a rtas_query_stopped state() call to the RTAS component of the firmware loader.

Resources used to access the processor are removed (step 510). Step 510 is performed to isolate the processor from the partition. In these examples, the isolation means that the processor can no longer act as an interrupt server. In other words, the processor can no longer receive and handle interrupts. The resources that are removed in this example include removing external interrupt sources, which specify the processor as the server and disable a global server queue that routes any external interrupts to the processor. This isolation is performed by the RTAS making a call to the hypervisor in response to the call from the operating system. Then, the state of the processor is changed to isolated (step 512).

After the processor has been isolated, the operating system is ready to return the processor to a global pool of available processors. The processor is unallocated (step 514) and the state of the processor is changed to unallocated (step 516). The deallocation is initiated by the operating system making the call to deallocate the processor. In this example, the call is a rtas_set_indicator() call made to the firmware loader, which includes the RTAS. The presently available rtas_set_indicator() call is modified to handle new types of indicators which are used by the mechanism of the present invention to perform the intended functions. The RTAS performs the deallocation by sending an unallocation or triggering event to the processor currently in the rtas_spin_loop(). This event is acknowledged by the processsor, which in turn, sends a call to the hypervisor to send the processor back to the global pool of available processors. The processor resets its partition register identifier to zero to indicate that it is now in an unallocated state. The unallocation or triggering event is also referred to as a "go to glocal proccesor pool" event. The partition identifier is updated by setting this ID to zero to indicate that the processor is now in the global pool of available processors (step 518). This update is made in a table, such as processor table 304 is located in NVRAM 300 in FIG. 3. An alert message is sent (step 520) and the process terminates thereafter. This alert message is sent to a hardware management console, such as console 264 in FIG. 2. This alert message is used to indicate that the processor has been deallocated.

Returning again to step 502, if a processor is selected, the process proceeds to step 506 as described above.

Figure 6:
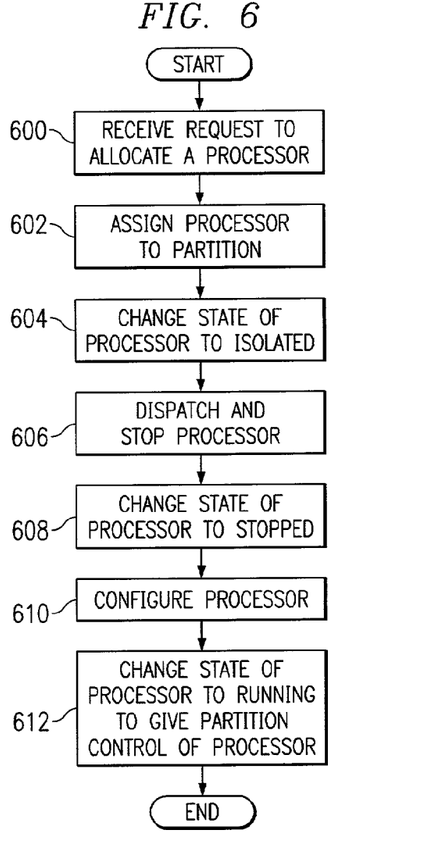
FIG. 6 is a flowchart of a process used for allocating a processor to a partition in accordance with a preferred embodiment of the present invention.

Turning now to FIG. 6, a flowchart of a process used for allocating a processor to a partition is depicted in accordance with a preferred embodiment of the present invention. The process illustrated in FIG. 6 may be implemented in a logical partitioned data processing system, such as logical partitioned platform 200 in FIG. 2.

The process begins by receiving a request to allocate a processor (step 600). The request in this step may be initiated by an operator or system administrator at a console, such as console 264 in FIG. 2. The operating system receives a grant to allocate a processor, which may or may not indicate which processor is to be allocated. If a processor is not identified, then a call is made to identify the processor. The operating system makes a call to have the processor assigned to the partition. The processor is then assigned to the partition (step 602). This assignment may be initiated using a rtas_set_indicator() call. In response to receiving this call from the operating system, the RTAS changes the state of the processor to isolated from unallocated (step 604).

The processor is dispatched and stopped (step 606). Upon being dispatched to the partition, the processor initializes its partition ID register and other hypervisor resource registers. Each processor has a partition ID register in its hardware. All processors belonging to the same partition must have the same partition ID value (obtained from the LPAR processor table) written into their internal partition ID registers. When the new processor is dispatched into the new partition, the processor's internal partition ID register is set to the same partition ID of the other processors already in the partition.

Processor hardwares use the partition ID for their normal operations. Similarly, there are other processor special registers such as page-table register, real-mode-offset register, real-mode-size register, etc., which are required to be initialized to the same values as used by the other processors already in the partition. The processor is stopped by being placed into a software state machine rtas_spin_loop() where the processor executes a spin loop process in which the processor waits for a triggering event to execute additional instructions. The state of the processor is changed to stopped (step 608). This is the result of the operating system making a call to unisolate the processor for configuration by the operating system. This state change is initiated by a call to the RTAS, such as a rtas_set_indicator() call in which a parameter is included to indicate the state change that is desired. In turn, the state of the processor is changed from isolated to stopped by the RTAS making a call to the hypervisor to change this state.

When the processor first enters the spin loop, as a result of step 604, the operating system may not know if the processor is successfully in the spin loop. Step 608 changes the state from isolated to stopped and is a mechanism for the operating system to confirm that the processor is indeed in the partition's RTAS state machine rtas_spin_loop(). As a result of step 608, the processor is now ready to be dispatched into the control of the OS's kernel processor resource manager.

The processor is configured (step 610). This configuration is initiated by the operating system. In this example, a rtas_configure_connector() call is made to the RTAS. The configuration performed may include, for example, setting up the processor to function as an interrupt server. Additionally, a global server queue may be enabled to route interrupts to this processor.

The state of the processor is changed to running to give full control of the processor to the operating system kernel (step 612) with the process terminating thereafter. This step is initiated by the operating system when it is ready to use a processor. The operating system may send a call, such as rtas_start_cpu(), to the RTAS to request control of the processor be given to the operating system. In response, the RTAS calls the hypervisor to set the state of this processor from stopped to running. Thereafter, the RTAS sends a triggering event to cause the processor to begin execution of instructions at a target address for the operating system. This triggering event may include a memory buffer address for the argument to the sub-routine at the target address. In response to this change of state, the processor acknowledges the event, exits the spin loop state, sets the memory buffer address provided into its register and branches to the sub-routine provided at the target address.

Figure 7:
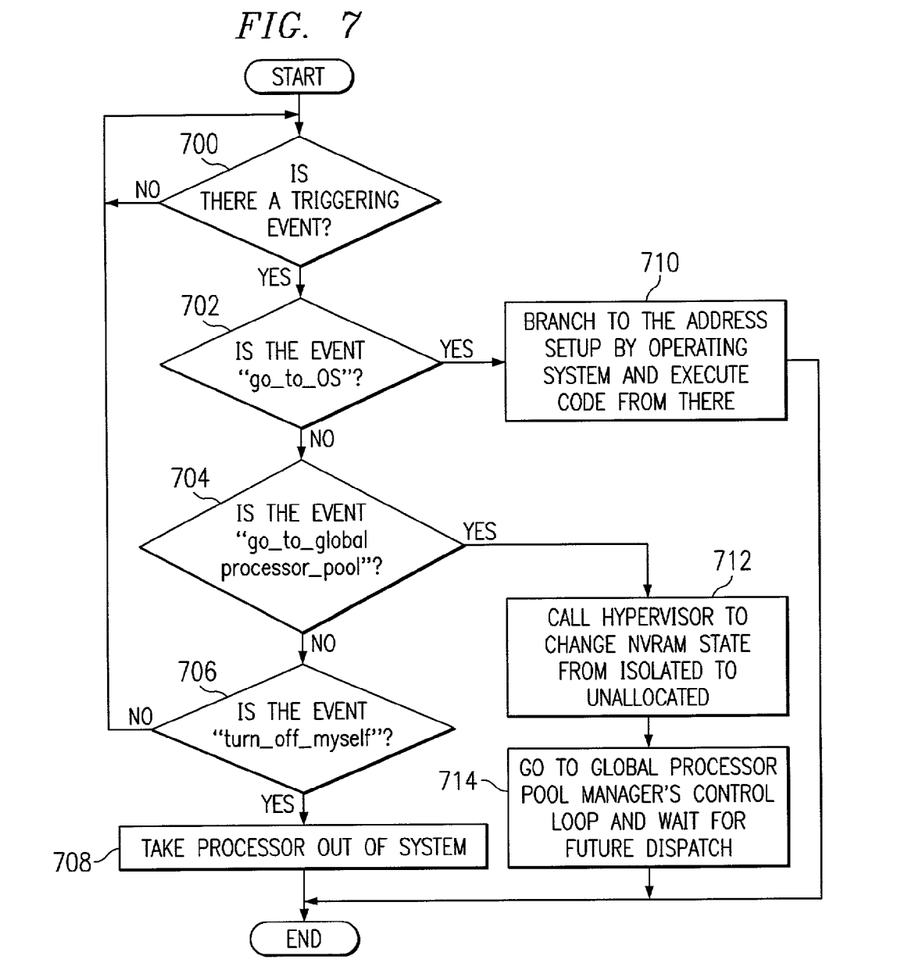
FIG. 7 is a flowchart of a process used for a spin loop software state machine in accordance with a preferred embodiment of the present invention.

With reference now to FIG. 7, a flowchart of a process used for a spin loop software state machine is depicted in accordance with a preferred embodiment of the present invention. The process illustrated in FIG. 7 may be implemented in a processor, such as processor 232 in FIG. 2. The process illustrated in FIG. 7 is a more detailed description of the events occurring when a processor enters a spin loop state, such as that initiated by a rtas_spin_loop() call. This state is also the stopped state, which occurs when the processor executes steps in the spin loop process described below.

The process begins by determining whether a triggering event has occurred (step 700). These events are specific instructions or parameters that may be passed in a call to the processor to cause the processor to perform a function or execute selected code. If a triggering event has occurred, a determination is then made as to whether the event is "go_to_OS" (step 702). If the event is not "go_to_OS", a determination is made as to whether the event is "go_to_globalprocessor_pool" (step 704). If the event is not "go_to_globalprocessor_pool", a determination is made as to whether the event is "turn_off_myself" (step 706). If the event is "turn_off_myself", the processor is taken out of the system (step 708) and the process terminates thereafter. An event taking the form of "turn_off_myself" occurs if the processor has been identified as being a bad processor or a processor having a malfunction at runtime.

Returning again to step 706, if the event is not "turn_off_myself", the process returns to step 700 as described above. If none of the triggering events are present, the process continues to return to step 606 in a "loop", also referred to as a "spin loop".

With reference again to step 704, if the event is "go_to_globalprocessor_pool", the hypervisor is called to change the NVRAM state from isolated to unallocated (step 712). The state is changed in a processor table, such as processor table 304 in FIG. 3. The process then executes in the global processor pool manager's processor control loop and waits for future dispatch (step 714) with the process terminating thereafter.

Referring again to step 702, if the event is a "go_to_OS", the processor branches to the address setup by the operating system and executes the code from there (step 710) with the process terminating thereafter. Step 710 illustrates the processor entering a running state from a stopped state. The processor has changed state from isolated to stopped before it can respond to the "go_to_OS" event to enter the running state in step 710.

Referring again to step 700, if a triggering event has not occurred, the process returns to the start.

Thus, the present invention provides an improved method, apparatus, and computer instructions for allowing dynamic deallocation and allocation of processor resources in a logical partitioned data processing system. This process allows a user or system administrator to send a request to deallocate a processor from one partition and have that processor allocated to another partition. The operating system initiates the steps needed to deallocate the processor from the partition and place it into a global pool for reallocation. When the reallocation is detected, the processor may then be allocated to another partition by changing the partition ID in a processor table, such as processor table 304 in FIG. 3. Thereafter, the user may send a request to the operating system in partition 2 to grant the processor to that partition with the operating system then performing the steps needed to allocate the processor. All of these steps are performed without having to terminate operation of either of the affected partitions.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, the particular components illustrated as participating in the dynamic allocation and deallocation of processors are an operating system, a RTAS, and a hypervisor. These particular components are described for purposes of illustration and are not intended to limit the manner in which the processes for the dynamic allocation may be implemented. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a logical partitioned data processing system for managing a set of processors in the logical partitioned data processing system, the method comprising:
    responsive to a request to deallocate a processor assigned to a partition within the logical partitioned data processing system, stopping the processor, wherein the processor belongs to the set of processors, and wherein the request is received from a first operating system running in the partition;
    responsive to stopping the processor, placing the processor in an isolated state, wherein the processor is isolated from the partition;
    placing the processor in a pool of resources for later reassignment; and
    responsive to an allocation request to allocate the processor, assigning the processor to another partition, wherein the another partition is different from the partition, and wherein the allocation request is received from a second operating system running in the second partition.

2. The method of claim 1, wherein placing the processor in an isolated state occurs by disabling an ability of the processor to handle interrupts.

3. The method of claim 1, wherein placing the processor in a pool of resources for later reassignment causes the processor change to an unallocated state which is a different state than the isolated state.

4. The method of claim 1, wherein the method performs deallocation of the processor in a dynamic basis.

5. The method of claim 1, wherein deallocation of the processor occurs without terminating execution of the partition.

6. The method of claim 1, wherein the allocation request is initiated by a user, and further comprising steps of:
    placing the processor in a spin loop software state, wherein the processor waits for a trigger event while in the spin loop software state, wherein the trigger event causes the processor to begin executing instructions;
    configuring the processor for use by the another partition;
    initializing resources used to access the processor;
    sending control of the processor to the another partition; and
    sending the triggering event to the processor to initiate the executing of the instructions.

7. The method of claim 6, wherein the triggering event includes a memory address parameter of an address that specifies where to initiate the executing of the instructions.

8. The method of claim 1, wherein the processor is stopped by the processor initiating a call to a hypervisor to change a state of the processor from running to stopped, wherein the hypervisor enforces the partitioning within the logical partitioned data processing system to enable simultaneous execution of a plurality of operating systems by the logical partitioned data processing system.

9. A method in a logical partitioned data processing system for managing processors in the logical partitioned data processing system, the method comprising:
    responsive to a request to deallocate a processor assigned to a partition within the logical partitioned data processing system, placing the processor into a spin loop software state machine to place the processor in a stopped state, wherein the request is received from a first operating system running in the partition;
    isolating the processor from the partition, wherein the partition is unable to access the processor; and
    deallocating the processor after the processor has been isolated from the partition, wherein the deallocating of the processor is initiated by a call made by the first operating system that results in a triggering event being sent to the processor that causes the processor to exit the spin loop software state machine.

10. The method of claim 9, wherein the deallocating step takes the processor out of the spin loop software state machine and places the processor into a pool for reallocation such that the processor is capable of being, but is not yet, allocated to a partition.

11. The method of claim 9, wherein the partition is a first partition and further comprising:
    responsive to receiving an allocation request to allocate the processor to a second partition after the processor has been deallocated, allocating the processor to the second partition in a state in which the second partition is unable to access the processor, wherein the allocation request is received from a second operating system running in the second partition;
    placing the processor into a spin loop software state machine;
    unisolating the processor from the partition after placing the processor in to the spin loop software state machine; and
    placing the processor into a running state in which the processor begins executing code at an address designated by the second partition.

12. The method of claim 11, wherein the step of placing the processor into a running state comprises sending a triggering event to the processor that causes the processor to exit the spin loop software state machine.

13. The method of claim 12, wherein deallocation and allocation of the processor occurs without terminating execution of the first partition and the second partition.

14. The method of claim 11 further comprising:
    configuring the processor for use in the second partition.

15. A logical partitioned data processing system for managing a set of processors, the logical partitioned data processing system comprising:
    a bus system;
    a communications unit connected to the bus system;
    a memory connected to the bus system, wherein the memory includes a set of instructions; and
    a processing unit having a set of processors connected to the bus system, wherein the processing unit executes the set of instructions to stop a processor in which the processor belongs to the set of processors in response to a request to deallocate a processor assigned to a partition within the logical partitioned data processing system, wherein the request is received from a first operating system running in the partition; place the processor in an isolated state in which the processor is isolated from the partition in response to stopping the processor; place the processor in a pool of resources for later reassignment: and assign, responsive to an allocation request to allocate the processor, the processor to another partition, wherein the another partition is different from the partition, and wherein the allocation request is received from a second operating system running in the second partition.

16. A logical partitioned data processing system for managing processors in the logical partitioned data processing system, the logical partitioned data processing system comprising:
a bus system;
a communications unit connected to the bus system;
a memory connected to the bus system, wherein the memory includes a set of instructions; and
a processing unit connected to the bus system, wherein the processing unit executes the set of instructions to place a processor in the processing unit into a spin loop software state machine to place the processor in a stopped state in response to a request to deallocate a processor assigned to a partition within the logical partitioned data processing system, wherein the request is received from a first operating system running in the partition; isolate the processor from the partition in which the partition is unable to access the processor; and deallocate the processor after the processor has been isolated from the partition, wherein the deallocate of the processor is initiated by a call made by the first operating system that results in a triggering event being sent to the processor that causes the processor to exit the spin loop software state machine.

17. A logical partitioned data processing system for managing a set of processors in the logical partitioned data processing system, the logical partitioned data processing system comprising:
stopping means, responsive to a request to deallocate a processor assigned to the partition within the logical partitioned data processing system, for stopping the processor, wherein the processor belongs to the set of processors, and wherein the request is received from a first operating system running in the partition;
first placing means, responsive to stopping the processor, for placing the processor in an isolated state, wherein the processor is isolated from the partition;
second placing means for placing the processor in a pool of resources for later reassignment; and
assigning means, responsive to an allocation request to allocate the processor, for assigning the processor to another partition, wherein the another partition is different from the partition, and wherein the allocation request is received from a second operating system running in the second partition.

18. The logical partitioned data processing system of claim 17, wherein placing the processor in an isolated state occurs by disabling an ability of the processor to handle interrupts.

19. The logical partitioned data processing system of claim 17, wherein placing the processor in a pool of resources for later reassignment causes the processor to change to an unallocated state which is a different state than the isolated state.

20. The logical partitioned data processing system of claim 17, wherein the method performs deallocation of the processor in a dynamic basis.

21. The logical partitioned data processing system of claim 17, wherein deallocation of the processor occurs without terminating execution of the partition.

22. The logical partitioned data processing system of claim 17, further comprising:
placing means for placing the processor in a spin loop software state, wherein the processor waits for a trigger event while in the spin loop software state, wherein the trigger event causes the processor to begin executing instructions;
configuring means for configuring the processor for use by the another partition;
initializing means for initializing resources used to access the processor;
first sending means for sending control of the processor to the another partition; and
second sending means for sending the triggering event to the processor to initiate the executing of the instructions.

23. The logical partitioned data processing system of claim 22, wherein the triggering event includes a memory address parameter of an address that specifies where to initiate the executing of the instructions.

24. The logical partitioned data processing system of claim 17 wherein the processor is stopped by the processor initiating a call to a hypervisor to change a state of the processor from running to stopped, wherein the hypervisor enforces the partitioning within the logical partitioned data processing system to enable simultaneous execution of a plurality of operating systems by the logical partitioned data processing system.

25. A logical partitioned data processing system for managing processors in the logical partitioned data processing system, the logical partitioned data processing system comprising:
placing means, responsive to a request to deallocate a processor assigned to a partition within the logical partitioned data processing system, for placing the processor into a spin loop software state machine to place the processor in a stopped state, wherein the request is received from a first operating system running in the partition;
isolating means for isolating the processor from the partition, wherein the partition is unable to access the processor; and
deallocating means, responsive to a call made by the first operating system that results in a triggering event being sent to the processor that causes the processor to exit the spin loop software state machine, for deallocating the processor after the processor has been isolated from the partition.

26. The logical partitioned data processing system of claim 25, wherein the deallocating means takes the processor out of the spin loop software state machine and places the processor into a pool for reallocation such that the processor is capable of being, but is not yet, allocated to a partition.

27. The logical partitioned data processing system of claim 25, wherein the partition is a first partition and wherein the placing means is a first placing means and further comprising:
allocating means, responsive to receiving an allocation request to allocate the processor to a second partition after the processor has been deallocated, for allocating the processor to the second partition in a state in which the second partition is unable to access the processor, wherein the allocation request is received from a second operating system running in the second partition;
second placing means for placing the processor into a spin loop software state machine;
unisolating means for unisolating the processor from the partition after placing the processor in to the spin loop software state machine; and third placing means for placing the processor in to a running state in which the processor begins executing code at an address designated by the second partition.

28. The logical partitioned data processing system of claim 27, wherein the third placing means comprises means for sending a triggering event to the processor that causes the processor to exit the spin loop software state machine.

29. The logical partitioned data processing system of claim 28, wherein deallocation and allocation of the processor occurs without terminating execution of the first partition and the second partition.

30. The logical partitioned data processing system of claim 27 further comprising:

configuring means for configuring the processor for use in the second partition.

31. A computer program product in a computer readable recordable medium for managing a set of processors in a logical partitioned data processing system, the computer program product comprising:

first instructions, responsive to a request to deallocate a processor assigned to a partition within the logical partitioned data processing system, for stopping the processor, wherein the processor belongs to the set of processors, and wherein the request is received from a first operating system running in the partition;

second instructions, responsive to stopping the processor, for placing the processor in an isolated state, wherein the processor is isolated from the partition;

third instructions for placing the processor in a pool of resources for later reassignment; and fourth instructions, responsive to an allocation request to allocate the processor, for assigning the processor to another partition, wherein the another partition is different from the partition, and wherein the allocation request is received from a second operating system running in the second partition.

32. A computer program product in a computer readable recordable medium for managing processors in the logical partitioned data processing system, the computer program product comprising:

first instructions, responsive to a request to deallocate a processor assigned to a partition within the logical partitioned data processing system, for placing the processor into a spin loop software state machine to place the processor in a stopped state, wherein the request is received from a first operating system running in the partition;

second instructions for isolating the processor from the partition, wherein the partition is unable to access the processor; and third instructions for deallocating the processor after the processor has been isolated from the partition, wherein the deallocating of the processor is initiated by a call made by the first operating system that results in a triggering event being sent to the processor that causes the processor to exit the spin loop software state machine.

* * * * *